United States Patent [19]

Sekimura et al.

[11] Patent Number: 4,637,253
[45] Date of Patent: Jan. 20, 1987

[54] SEMICONDUCTOR FLOW DETECTOR FOR DETECTING THE FLOW RATE AND FLOWING DIRECTION OF FLUID

[75] Inventors: Masayuki Sekimura, Yokohama; Shunji Shirouzu, Ayase, both of Japan

[73] Assignee: Kabushiki Kaisha Toshiba, Kawasaki, Japan

[21] Appl. No.: 733,796

[22] Filed: May 14, 1985

[30] Foreign Application Priority Data

May 22, 1984 [JP] Japan .................. 59-103028
May 22, 1984 [JP] Japan .................. 59-103030

[51] Int. Cl.$^4$ ............................ G01F 1/68; G01P 5/10
[52] U.S. Cl. ........................................ 73/189; 73/204
[58] Field of Search .................. 73/204, 189; 364/510

[56] References Cited

U.S. PATENT DOCUMENTS

| 3,352,154 | 11/1967 | Djorup | 73/204 |
|---|---|---|---|
| 3,680,377 | 8/1972 | Ligthner | 73/204 |
| 3,968,685 | 7/1976 | MacHattie | 73/204 |
| 3,992,940 | 11/1976 | Platzer, Jr. | |
| 3,995,481 | 12/1976 | Djorup | 73/204 |

FOREIGN PATENT DOCUMENTS 7609696  5/1978  Netherlands .......... 73/204

OTHER PUBLICATIONS

Van Riet et al. "Integrated Direction Sensitive Flowmeter" in Electronic Leters, 11/25/76, vol. 12, #24, pp. 647, 648.
IEEE Trans. Ed-29 (1982) 133-136; J. H. Huijsing et al.

Primary Examiner—Herbert Goldstein
Attorney, Agent, or Firm—Oblon, Fisher, Spivak, McClelland & Maier

[57] ABSTRACT

Disclosed is a semiconductor flow detector, comprising a semiconductor flow detecting element including a heating element and a pair of temperature-measuring elements formed in the substrate, a detecting element for detecting the temperature of the fluid under measurement, a first driving circuit for heating the heating element to keep the temperature of the semiconductor flow detecting element higher by a prescribed level than the temperature of the fluid under measurement, an electric power detection circuit for detecting the electric power flowing through the heating element so as to generate an electric power detection signal, a second driving circuit for driving the pair of the temperature-measuring elements, a temperature difference detecting circuit for detecting the temperature difference between the pair of the temperature-measuring elements so as to generate a temperature difference signal, and an arithmetic circuit for performing prescribed arithmetic operations among the electric power detection signal and the temperature difference signal so as to determine the flow rate and flowing direction of the fluid.

13 Claims, 20 Drawing Figures

F I G. 5
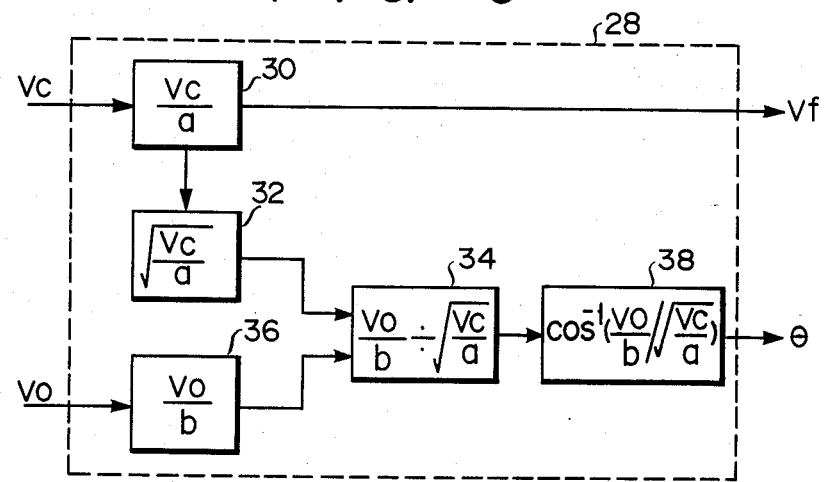
F I G. 6
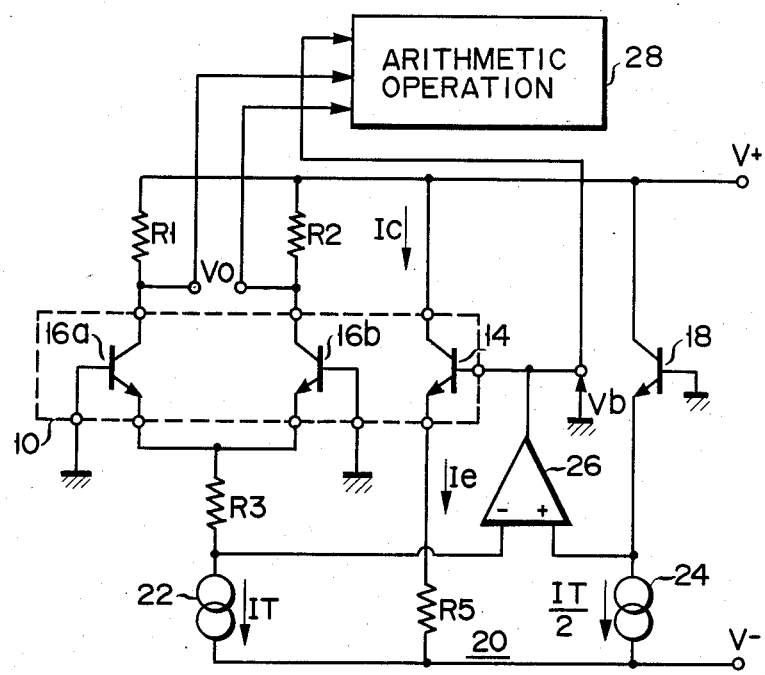

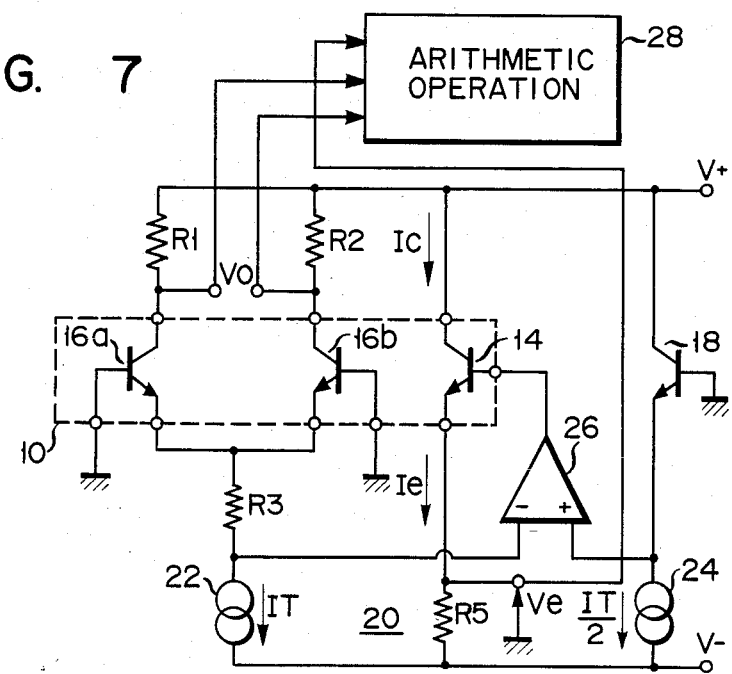
F I G. 7
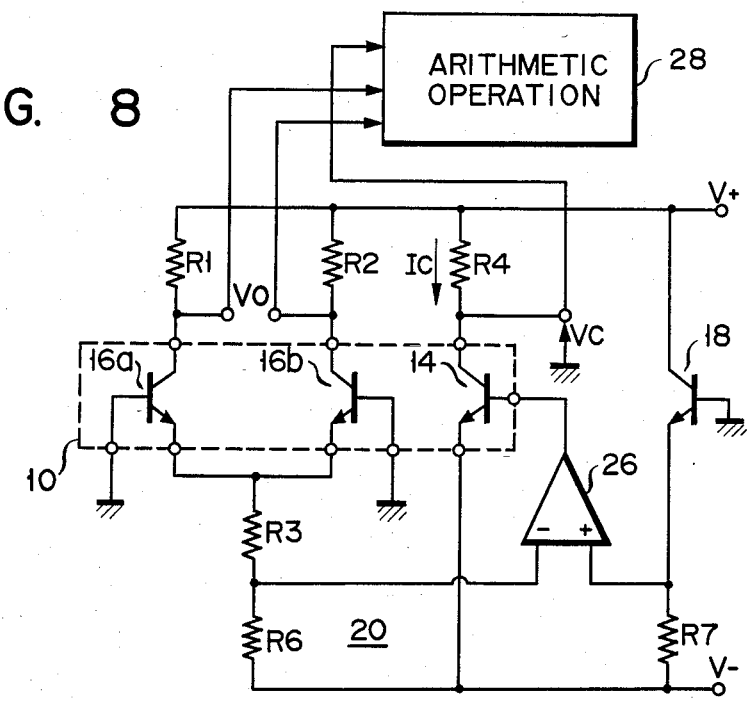
F I G. 8

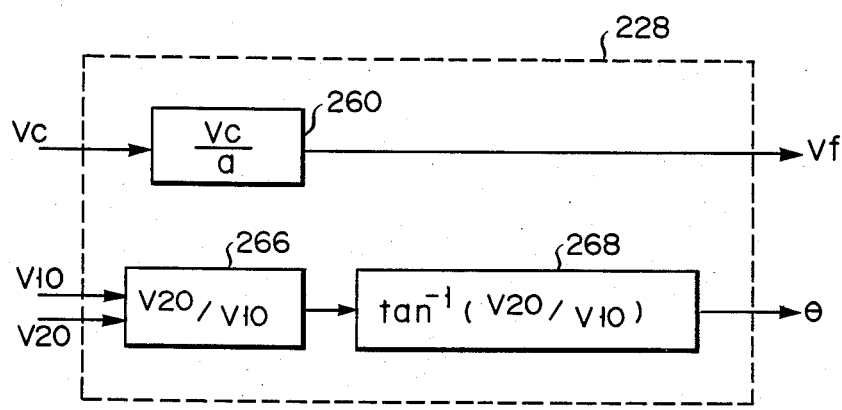
F I G. 20

SEMICONDUCTOR FLOW DETECTOR FOR DETECTING THE FLOW RATE AND FLOWING DIRECTION OF FLUID

BACKGROUND OF THE INVENTION

The present invention relates to a semiconductor flow detector for detecting the flow rate and flowing direction of fluid.

To measure the flow of fluid, which plays a vital role in industries and everyday life, is employed in a wide area. Flow detectors of, for example, heat ray type and ultrasonic wave type are known to the art. However, the detectors of these types are bulky and complex in structure, leading to a high manufacturing cost. Also, these detectors are not suitable for mass production.

On the other hand, a semiconductor flow detector, which is small and permits measuring the flow rate at a low cost, is disclosed in, for example, "Monolithic Integrated Direction-Sensitive Flow Sensor" by Johan H. Huijsing et al; IEEE Transactions on Electron Devices, Vol. ED-29, No. 1, January 1982, and U.S. Pat. No. 3,992,940 to George E. Platzer, Jr. However, these detectors, which permit measuring only the flow rate of fluid, are incapable of measuring the flowing direction of fluid. In addition, a nonlinear relationship resides between the flow rate and the output voltage.

A detector capable of simultaneously measuring both the flow rate and flowing direction has not yet been developed except for the mechanical detector used for a weather survey. Under the circumstances, it is a matter of serious concern in this field to develop an inexpensive, small flow detector which readily permits measuring both the flow rate and flowing direction of fluid.

SUMMARY OF THE INVENTION

An object of the present invention is to provide a semiconductor flow detector capable of measuring both the flow rate and flowing direction of fluid.

Another object is to provide a semiconductor flow detector producing a high output voltage which is substantially proportional to the flow rate of fluid.

Still another object is to provide a semiconductor flow detector which is small in size, simple in construction and can be produced at a low cost.

According to the present invention, there is provided a semiconductor flow detector, comprising:

a first semiconductor flow detecting element including a first heating element formed in the center portion of a semiconductor substrate and a first pair of temperature-measuring elements arranged on side edge portions of the semiconductor substrate to have the first heating element sandwiched therebetween, said temperature measuring elements being positioned symmetrical with respect to the first heating element;

means for detecting the temperature of the fluid under measurement to generate a temperature detection signal;

a first driving means for heating the first heating element in accordance with the temperature detection signal to keep the temperature of the first semiconductor flow detecting element higher by a prescribed level than the temperature of the fluid under measurement;

a first electric power detecting means for detecting the electric power corresponding to the current flowing through the first heating element and contributing to the heating thereof so as to generate a first electric power detection signal;

a second driving means for driving the first pair of the temperature measuring elements;

a first temperature difference detecting means for detecting the difference in temperature between the first pair of the temperature measuring elements in terms of an electric signal so as to generate a first temperature difference signal; and an arithmetic means for performing a prescribed arithmetic operation between the first electric power detection signal and the first temperature difference signal so as to obtain the flow rate and flowing direction of the fluid.

The particular construction of the present invention makes it possible to provide a small semiconductor flow detector at a low cost which permits simultaneously detecting the flow rate and flowing direction of fluid. What should also be noted is that a linear relationship is established between the flow rate and the detected output signal, making it possible to detect the flow velocity at a high accuracy.

BRIEF DESCRIPTION OF THE DRAWINGS

FIG. 5 is a block diagram showing the arithmetic circuit 28 included in the detector shown in FIG. 2;

FIGS. 6–10 are circuit diagrams showing semiconductor flow detectors according to second to sixth embodiments of the present invention;

FIG. 20 is a block diagram showing the construction of the arithmetic circuit 228 included in the circuit shown in FIG. 18.

DETAILED DESCRIPTION OF THE PREFERRED EMBODIMENTS

Figure 1:
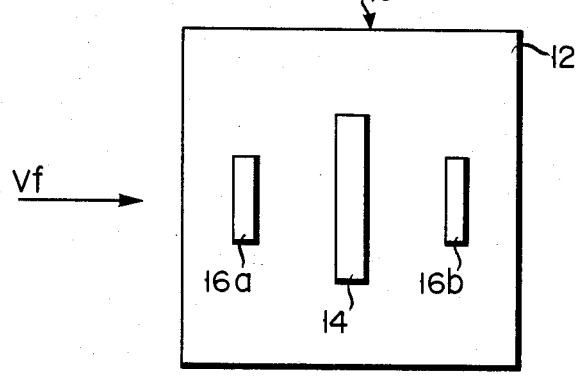
FIG. 1 is a plan view of a semiconductor flow detecting element included in a semiconductor flow detector of the present invention.
Figure 2:
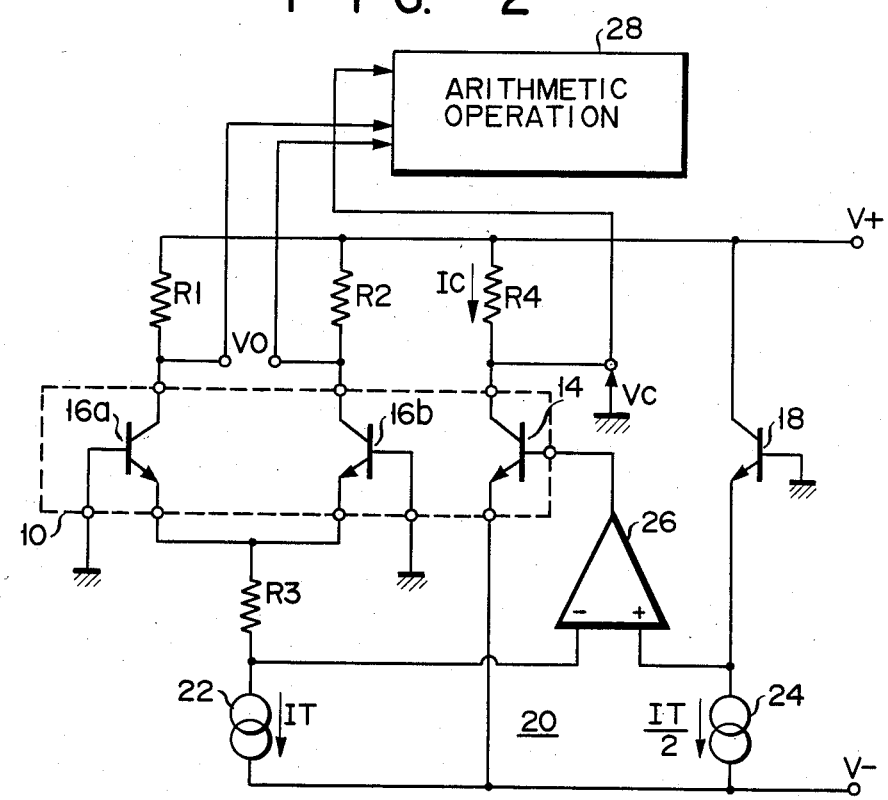
FIG. 2 shows a circuit diagram of the semiconductor flow detector according to one embodiment of the present invention.

FIGS. 1–5 collectively show a first embodiment of the present invention. As seen from FIG. 1, a semiconductor flow detecting element 10 comprises a heating transistor 14 formed in the central portion of a semiconductor substrate 12 and a pair of temperature-measuring transistors 16a, 16b symmetrically disposed with respect to the heating transistor 14. A fluid temperature-detecting transistor 18 (FIG. 2) serving to detect the temperature of the fluid and to generate a temperature detection signal is provided within the fluid to be measured. Temperature of the fluid is measured on the basis of the principle that the base-emitter voltage of the transistor 18 is changed in proportion to the change in temperature. It should be noted that the transistors 16a, 16b are cooled to a different extent by the fluid flowing at a velocity vf. The temperature difference mentioned is detected in the form of an electric signal. FIG. 2 shows that a driving circuit 20 for heating the transistor 14 is connected to the semiconductor flow detecting element 10. The transistor 14 is heated by the driving circuit 20 in accordance with the fluid temperature detection signal to keep the temperature of the element 10 higher by a prescribed level than the temperature of the fluid to be measured. The element 10, fluid temperature-detecting trasistor 18 and driving circuit 20 are connected to each other as shown in FIG. 2 so as to form a semiconductor flow detecting circuit.

To be more specific, the collector of the temperature-measuring transistor 16a included in the semiconductor flow detecting element 10 is connected via a resistor R1 to a first power source $V^+$, as shown in FIG. 2. The base of the transistor 16a is connected to the ground, with the emitter of the transistor 16a being connected to a second power source $V^-$ via a resistor R3 and a constant current source 22. The collector of the temperature-measuring transistor 16b is also connected to the first power source $V^+$ via a resistor R2, with the emitter of the transistor 16b being connected to the emitter of the transistor 16a. The base of the transistor 16b is also connected to the ground. The collector of the heating transistor 14 is connected to the first power source $V^+$ via a resistor R4, with the emitter of the transistor 14 connected to the second power source $V^-$. The base of the transistor 14 is connected to the output terminal of an operational amplifier 26. The collector and base of the fluid temperature-detecting transistor 18 are connected to the first power source $V^+$ and to the ground, respectively. Also, the emitter of the transistor 18 is connected to the second power source $V^-$ via a constant current source 24. The node between the resistor R3 and the constant current source 22 is connected to the inverted input terminal of the operational amplifier 26, with the noninverted input terminal of the amplifier 26 being connected to the node between the emitter of the transistor 18 and the constant current source 24. The operational amplifier 26 serves to keep the temperature of the semiconductor flow detecting element 10 higher by a prescribed level than the temperature of the fluid under measurement. Specifically, the input signals supplied to the inverted and noninverted input terminals are compared within the amplifier 26 to produce an output signal which is supplied to the base of the heating transistor 14. As a result, the collector current Ic flowing through the transistor 14 is controlled to keep the temperature of the flow detecting element 10 as desired. It should be noted that an output voltage Vo corresponding to the temperature difference between the temperature-measuring transistors 16a and 16b, said temperature difference being changed by the flow velocity of the fluid, is generated between the collectors of the transistors 16a and 16b. The output voltage Vo is supplied to an arithmetic circuit 28. The collector potential Vc of the heating transistor 14, which is changed by the collector current Ic, is also supplied to the arithmetic circuit 28. A prescribed arithmetic operation is carried out within the arithmetic circuit 28 using the collector potential Vc and the output voltage Vo mentioned above so as to obtain the flow rate and flowing direction of the fluid.

Figure 3:
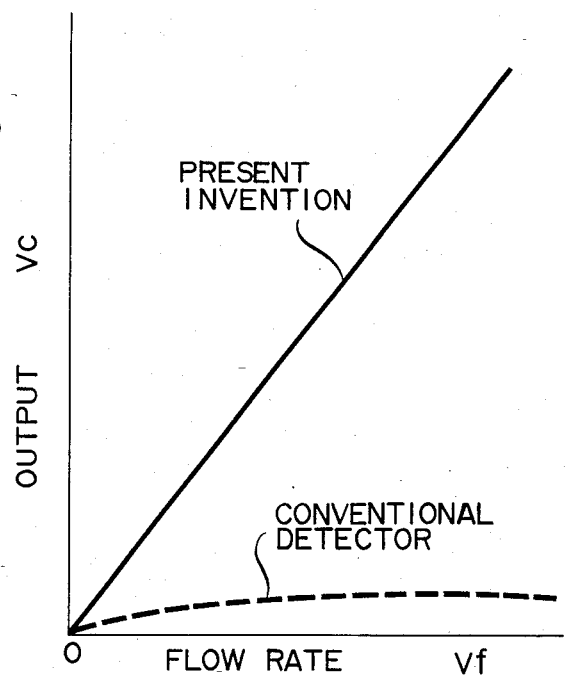
FIG. 3 is a graph showing the relationship between the flow rate vf of the fluid to be measured and the output voltage Vc of the semiconductor flow detector shown in FIG. 2, the broken line covering the conventional flow detector.

FIG. 3 is a graph showing the relationship between the flow rate vf and the collector potential Vc changing with the flow rate vf. As seen from the graph, the output voltage of the flow detector of the present invention is markedly greater than that of the conventional semiconductor flow detector disclosed in, for example, "Monolithic Integrated Direction Sensitive Flow Sensor." Also, the graph for the present invention is substantially straight. What should also be noted is that the semiconductor flow detector of the present invention is substantially independent of the flowing direction of the fluid, making it possible to accurately measure the flow rate vf from the output Vc.

As apparent from FIG. 2, the collector potential Vc of the heating transistor 14 is:

$$Vc = a \cdot vf \qquad (1)$$

It follows that the flow rate vf of the fluid is:

$$vf = Vc/a.$$

Figure 4:
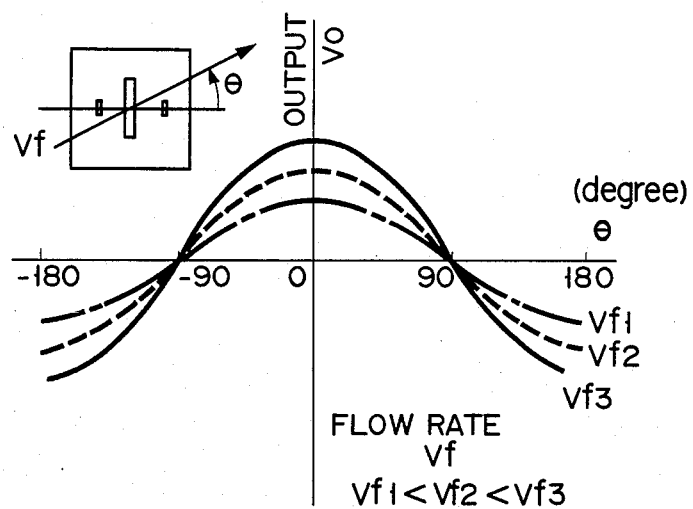
FIG. 4 is a graph showing the relationship between the flowing direction $\theta$ of the fluid to be measured and the output voltage Vo of the semiconductor flow detector shown in FIG. 2, the flow rate vf being used as a parameter.

FIG. 4 shows the dependence of the output Vo obtained between the collectors of the temperature-measuring transistors 16a and 16b on the flowing direction $\theta$ of the fluid. According to the graph of FIG. 4, the following relationship is established among the flow rate vf of the fluid, the flowing direction $\theta$ of the fluid and the output Vo:

$$Vo = b \cdot \sqrt{vf} \cos \theta \qquad (2)$$

Thus:

$$\sqrt{vf} = \sqrt{Vc/a} \qquad (3)$$

$$Vo/b = \sqrt{Vf} \cos \theta \qquad (4)$$

$$\cos \theta = [Vo/b]/[\sqrt{Vc/a}] \qquad (5)$$

$$\theta = \cos^{-1}[(Vo/b)/\sqrt{Vc/a}] \qquad (6)$$

In this method, it is possible to obtain the flowing direction $\theta$ ($0 \leq \theta \leq 180$) of the fluid from the outputs Vo and Vc.

The arithmetic circuit 28 capable of performing the above-noted operation is constructed as shown in FIG. 5. Specifically, the collector potential Vc of the heating transistor 14 is supplied to a division circuit 30 to perform the operation of formula (1) so as to calculate the flow rate of the fluid. Also, a flow rate signal is supplied from the division circuit 30 to a square root calculating circuit 32. The calculation of formula (3) is carried out in the circuit 32, and the result of the calculation is transmitted to a division circuit 34. On the other hand, the output signal of the temperature-measuring transistors 16a, 16b corresponding to the temperature difference is supplied to a division circuit 36 in which calculation of Vo/b is carried out. The result of the calculation is supplied to the division circuit 34 mentioned previously; i.e., the division circuit 34 is supplied with the output signals of both the square root calculation circuit 32 and the division circuit 36. The calculation of formula (5) is carried out in the division circuit 34 so as to obtain the value of cos $\theta$. Result of the calculation is supplied from the division circuit 34 to an arithmetic circuit 38 in which calculation of formula (6) is carried out so as to obtain the flowing direction $\theta$ of the fluid. In this method, the flow rate vf and flowing direction $\theta$ of the fluid can be simultaneously obtained in the present invention. It should also be noted that the flow rate vf of the fluid and the output Vc of the heating transistor 14 bears a linear relationship, leading to a high accuracy of the measurement. Accuracy of the measurement is further improved because the output Vc has a markedly high voltage level.

FIG. 6 shows a second embodiment of the present invention. This embodiment is based on the principle that the collector current Ic is substantially equal to the emitter current Ie in a bipolar transistor. Thus, in the embodiment of FIG. 6, the base potential Vb is detected as the output in place of the collector potential Vc. The circuit of FIG. 6 is substantially equal to that of FIG. 2, except that a resistor R5 is provided to detect the base potential Vb and the resistor R4 shown in FIG. 2 is not used in the circuit of FIG. 6 because the collector potential need not be detected in the embodiment of FIG. 6. The reference numerals common with FIGS. 2 and 6 denote the same members and, thus, description thereof is omitted.

FIG. 7 shows a third embodiment of the present invention. This embodiment is substantially equal in its construction to the second embodiment shown in FIG. 6, except that, in the third embodiment, the emitter potential Ve is detected in place of the base potential Vb detected in the second embodiment shown in FIG. 6. To detect the emitter potential Ve, a resistor R5 is included in the circuit of FIG. 7. Of course, the third embodiment also permits producing the output Ve having a linear relationship with the flow rate vf of the fluid. The reference numerals common with FIGS. 6 and 7 denote the same members and, thus, description thereof is omitted.

FIG. 8 shows a fourth embodiment of the present invention. This embodiment is substantially equal in its construction to the first embodiment shown in FIG. 2, except that, in the fourth embodiment, resistors R6 and R7 are substituted for the constant current sources 22 and 24 shown in FIG. 2, respectively. Of course, the fourth embodiment shown in FIG. 8 also permits producing the particular effect of the present invention. The reference numerals common with FIGS. 2 and 8 denote the same members and, thus, description thereof is omitted.

Figure 9:
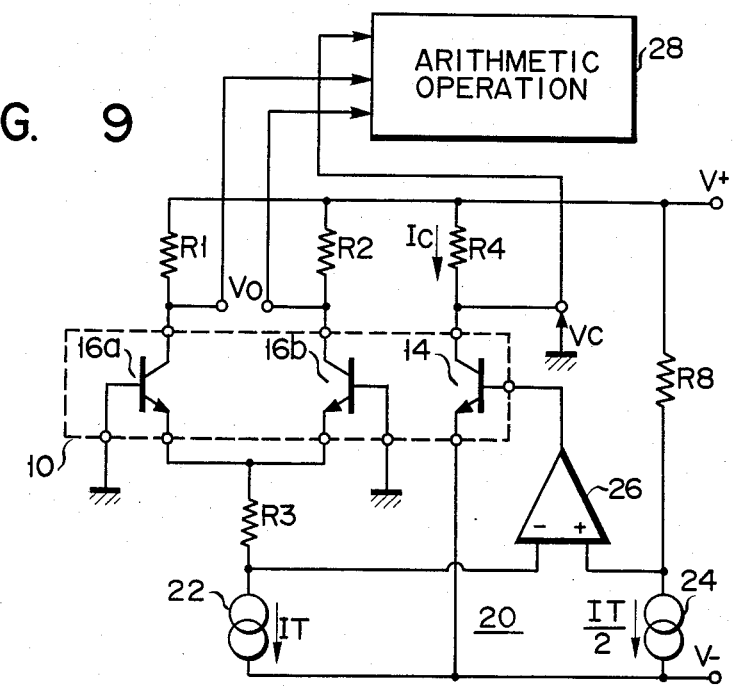

FIG. 9 shows a fifth embodiment of the present invention. This embodiment is substantially equal in its construction to the first embodiment shown in FIG. 2, except that, in the fifth embodiment, a resistor R8 is substituted for the fluid temperature-detecting transistor 18 shown in FIG. 2. The resistor R8 can be substituted for the transistor 18 where the temperature fluctuation of the fluid is small. The reference numerals common with FIGS. 2 and 9 denote the same members and, thus, description thereof is omitted.

Figure 10:
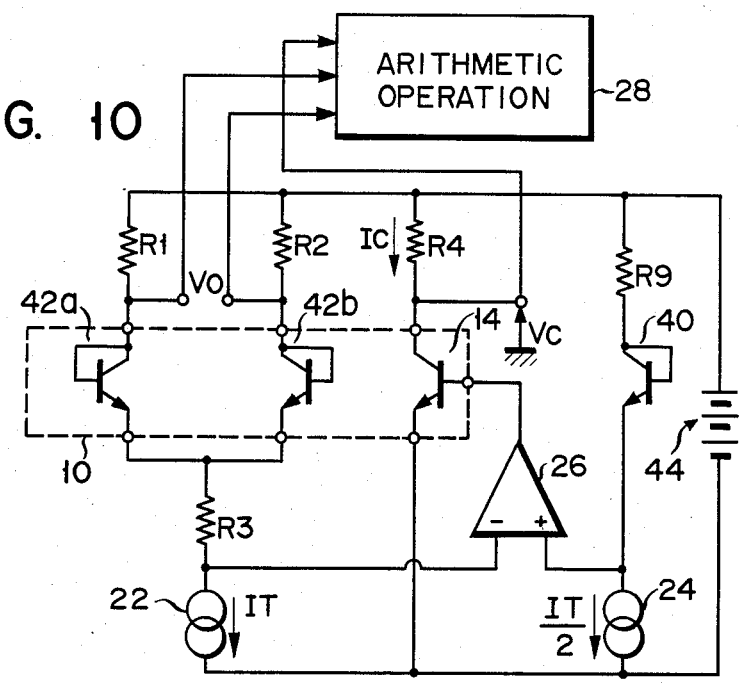

FIG. 10 shows a sixth embodiment of the present invention. This embodiment is substantially equal in its construction to the first embodiment shown in FIG. 2, except that, in the sixth embodiment, diodes or diode-connected transistors 40, 42a and 42b are substituted for the fluid temperature-detecting transistor 18, temperature-measuring transistors 16a and 16b shown in FIG. 2, respectively. Also, the semiconductor fluid detector shown in FIG. 10 is driven by a single power source 44. Further, the collector of the transistor 40 is connected to the positive terminal of the power source 44 via a resistor R9 which is intended to diminish the potential difference between the inverted and noninverted input terminals of the operational amplifier 26. Of course, the sixth embodiment shown in FIG. 10 permits producing the particular effect of the present invention. The reference numerals common with FIGS. 2 and 10 denote the same members and, thus, description thereof is omitted.

Figure 11:
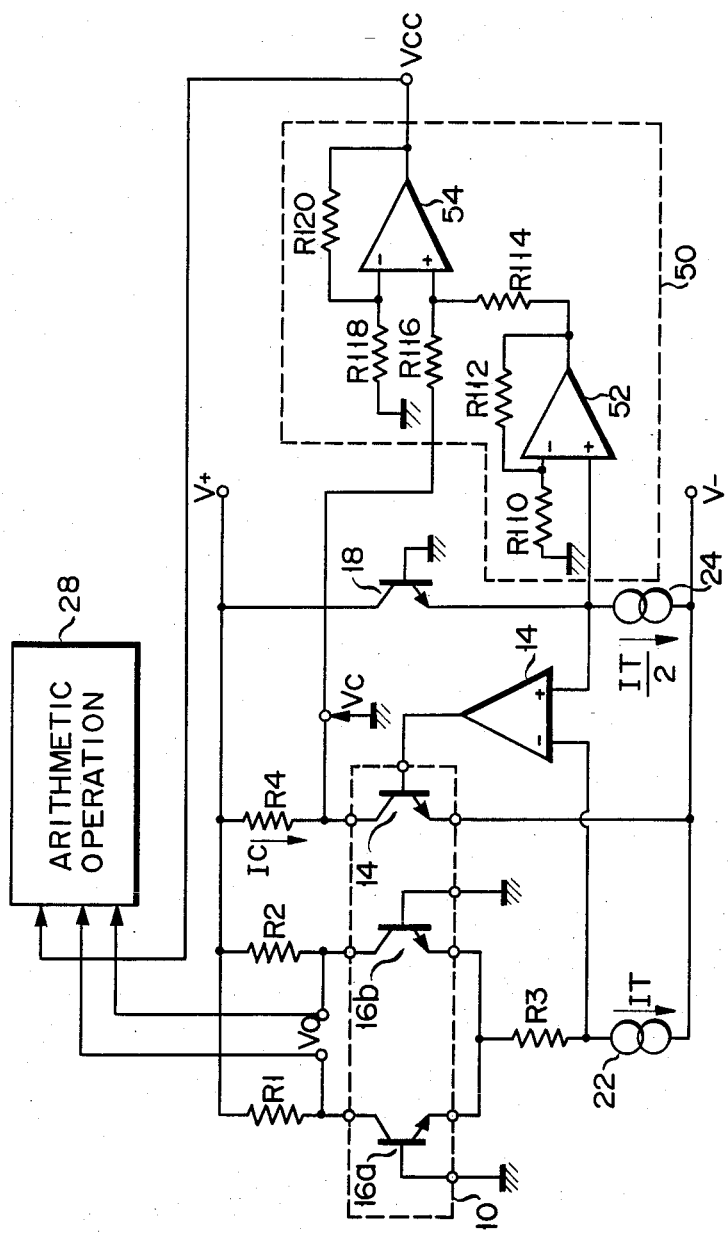
FIG. 11 is a circuit diagram showing a semiconductor flow detector according to a seventh embodiment of the present invention.

FIG. 11 shows a seventh embodiment of the present invention. This embodiment is substantially equal to the embodiment shown in FIG. 2, except that, in the seventh embodiment, a compensation circuit 50 is provided in order to compensate the fluctuation of the output Vc caused by the temperature fluctuation. Where current does not flow through the heating transistor 14 included in the semiconductor flow detecting element 10 shown in FIG. 2, the collector potential Vc of the transistor 14 is changed in proportion to the temperature as shown below:

$$Vc = Vco - \alpha c(T - To) \qquad (7)$$

where; "Vco" is the collector potential under the reference temperature "To", and "$\alpha c$" is the temperature coefficient.

As well known, the emitter potential of a transistor is also changed in proportion to the temperature as shown below:

$$Vbe = \alpha T(T - To) - Vbeo \qquad (8)$$

where; "Vbeo" is the emitter potential under the reference temperature "To", and "$\alpha T$" is the temperature coefficient.

As mentioned above, both the collector potential Vc and the emitter potential Vbe are changed in proportion to the temperature. Thus, it is possible to obtain an output which is not changed by the temperature, by applying an arithmetic operation to Vc and Vbe.

The compensation circuit 50 consists of two operational amplifiers 52, 54 and resistors R110, R112, R114, R116, R118 and R120. The noninverted input terminal of the operational amplifier 14 is connected to the noninverted input terminal of the operational amplifier 52, with the inverted input terminal of the amplifier 52 being connected to the ground via the resistor 110. The output terminal of the amplifier 52 is connected to its inverted input terminal via the resistor R112 and to the noninverted input terminal of the amplifier 54 via the resistor R114. The collector potential Vc of the heating transistor 14 is supplied to the noninverted input terminal of the operational amplifier 54 via the resistor R116. The inverted input terminal of the amplifier 54 is connected to the ground via the resistor R118 and to its output terminal via the resistor R120. The compensated output voltage Vcc is obtained from the output terminal of the operational amplifier 54 and supplied to the arithmetic circuit 28. As a result, the flow rate and the flowing direction of the fluid are obtained as in the first embodiment shown in FIG. 2. It should be noted that the resistors R114, R116, R118 and R120 included in the compensation circuit 50 have the same resistance.

In the embodiment of FIG. 11, the output Vcc of the semiconductor flow detector is:

$$Vcc = Vc + (1 + R112/R110)Vbe \qquad (9)$$

Substituting formulas (7) and (8) in formula (9);

$$Vcc = [VcO + \alpha cTo - (1 + R112/R110)(\alpha T \cdot To + V\text{-}beo)] + [(1 + R112/R110)\alpha T - \alpha c]T \qquad (10)$$

The second term of formula (10) denotes that the output Vcc is changed with temperature. Thus, the output Vcc can be made independent of the temperature by properly selecting the resistances of the resistors R110 and R112 to make the temperature-dependent second term zero as shown below:

$$(1 + R112/R110)\alpha T - \alpha c = 0 \qquad (11)$$

Figure 12:
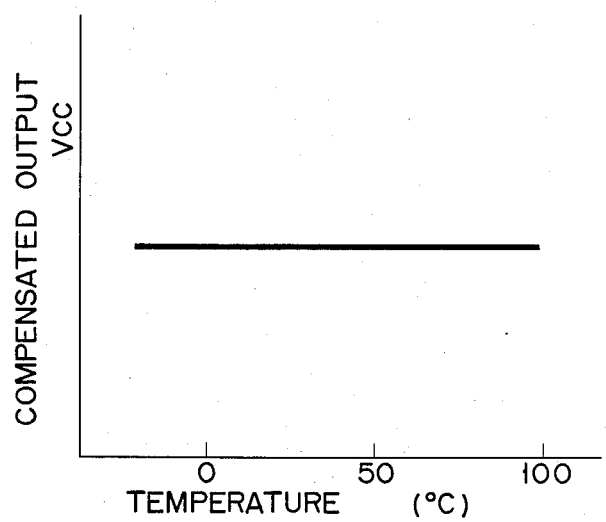
FIG. 12 is a graph showing the relationship between the fluid temperature and the compensated output Vcc of the detected value Vc of the circuit shown in FIG. 11.

FIG. 12 shows the temperature characteristics at the zero point output of the semiconductor flow detector shown in FIG. 11. It is seen that the zero point output is not changed at all by the change in temperature. Of course, the embodiment of FIG. 11 permits more accurately measuring the flow rate and flowing direction of the fluid. The reference numerals common with FIGS. 2 and 11 denote the same members and, thus, description thereof is omitted.

Figure 13:
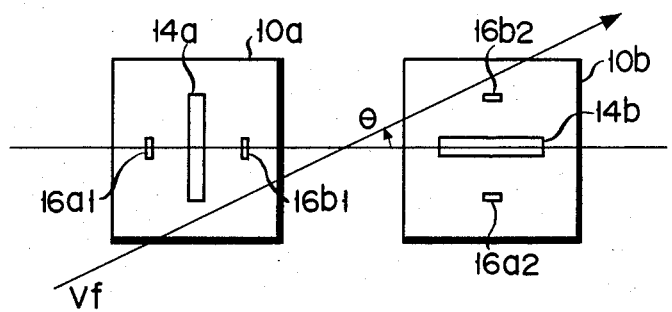
FIG. 13 is a plan view of a semiconductor flow detecting element included in a semiconductor flow detector according to the eighth embodiment of the present invention.
Figure 14:
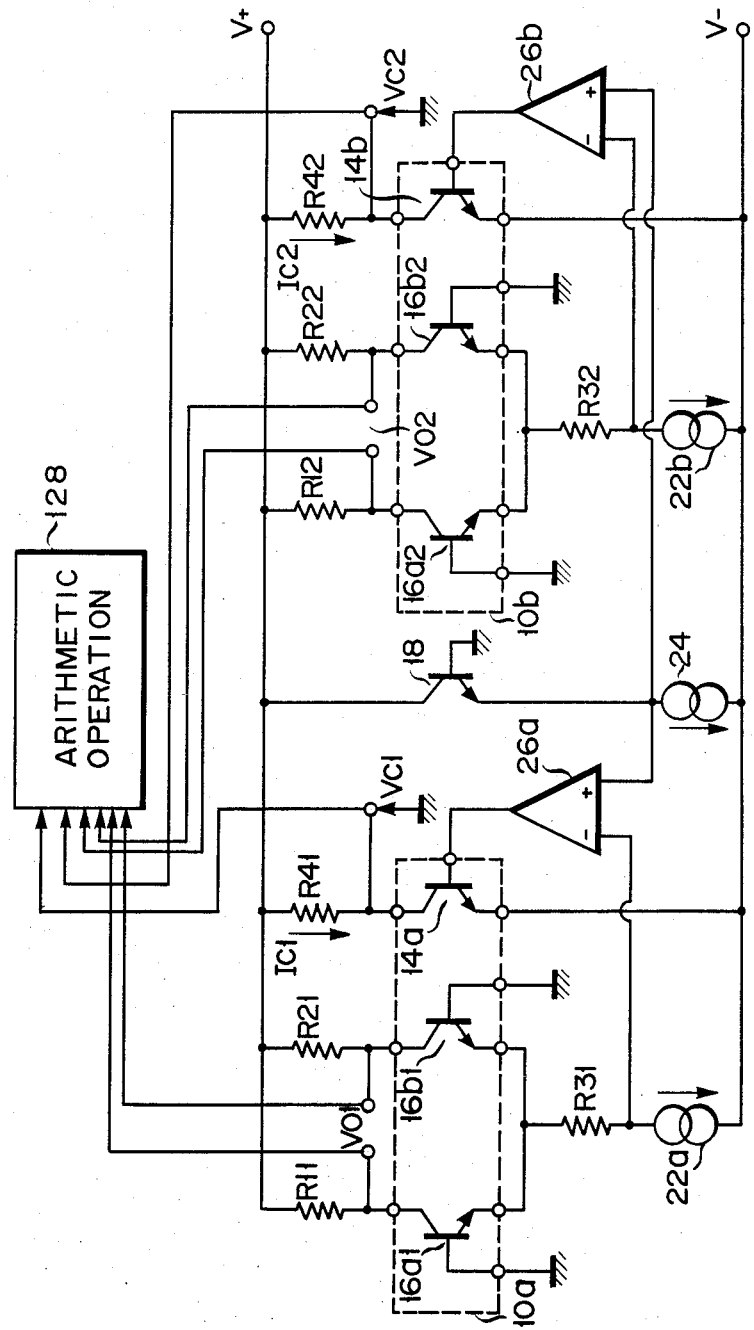
FIG. 14 is a circuit diagram showing the semiconductor flow detector according to the eighth embodiment of the present invention.
Figure 15:
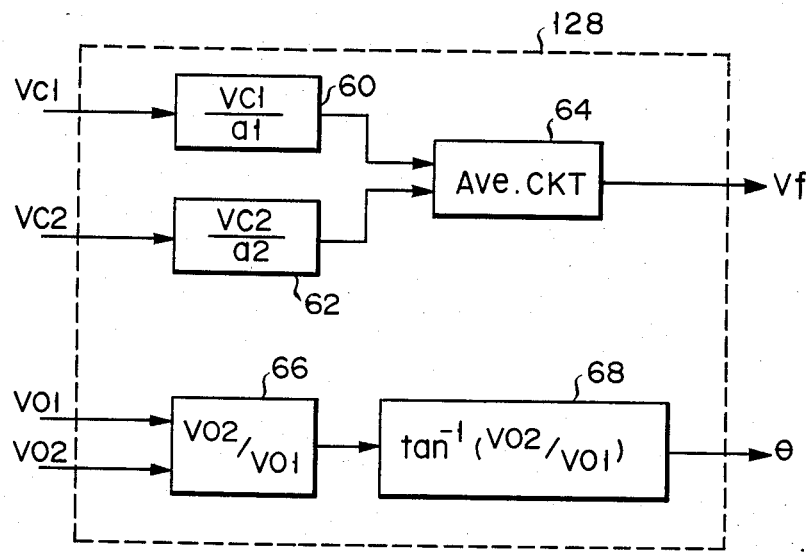
FIG. 15 is a block diagram showing the arithmetic circuit 128 included in the circuit shown in FIG. 14.

FIGS. 13–15 collectively show the eighth embodiment of the present invention. Two pairs of semiconductor flow detecting elements are used in this embodiment so as to measure the flow rate and flowing direction of the fluid over a range of 0°–360°. It should be noted that semiconductor flow detecting elements 10a and 10b are disposed 90° deviant from each other. As seen from FIG. 13, the semiconductor flow detecting element 10a consists of a heating transistor 14a and a pair of temperature-measuring transistor 16a1 and 16b1, with the element 10b consisting of a heating transistor 14b and a pair of temperature-measuring transistors 16a2 and 16b2. The fluid flows in the direction of an angle $\theta$ at a rate of vf.

FIG. 14 shows that the collector of the temperature-measuring transistor 16a1 included in the element 10a is connected to the first power source V+ via the resistor R11, with the base of the transistor 16a1 being connected to the ground. The emitter of the transitor 16a1 is connected to the second power source V− via the resistor R31 and a constant current source 22a. The collector of the temperature-measuring transistor 16b1 is connected to the first power source V+ via the resistor R21, with the base of the transistor 16b1 being connected to the ground. Also, the emitters of the transistors 16a1 and 16b1 are connected to each other. The collector of the heating transistor 14a is connected to the first power source V+ via the resistor R41, with the base of the transistor 14a being connected to the output terminal of an operational amplifier 26a. The emitter of the transistor 14a is connected to the second power source V−. The collector of the fluid temperature-detecting transistor 18 is connected to the first power source V+, with the base of the transistor 18 being connected to the ground. The emitter of the transistor 18 is connected to the second power source V− via a constant current source 24. The node between the resistor R31 and the constant current source 22a is connected to the inverted input terminal of the operational amplifier 26a. Further, the node between the emitter of the transistor 18 and the constant current source 24 is connected to the noninverted input terminal of the operational amplifier 26a. The input signals supplied to the inverted and noninverted input terminals are compared within the amplifier 26a to produce an output signal which is supplied to the base of the heating transistor 14a. As a result, the collector current IC1 flowing through the transistor 14a is changed so as to keep the temperature of the semiconductor flow detecting element 10a higher by a prescribed level than the temperature of the fluid under measurement. It should be noted that an output voltage Vo1 corresponding to the difference in temperature between the temperature-measuring transistors 16a1 and 16b1, which is changed by the flow velocity of the fluid, is generated between the collectors of the temperature-measuring transistors 16a1 and 16b1. The output voltage Vo1 is supplied to an arithmetic circuit 128. The arithmetic circuit 128 is also supplied with the collector potential Vc1 of the transistor 14a which is changed by the collector current Ic1.

The collector of the temperature-measuring transistor 16a2 included in the semiconductor flow detecting element 10b is connected to the first power source V+ via the resistor R12, with the base of the transistor 16a2 being connected to the ground. The emitter of the transistor 16a 2 is connected to the second power source V− via the resistor 32 and a constant current source 22b. The collector of the temperature-measuring transistor 16b2 is connected to the first power source V+ via the resistor R22, with the base of the transistor 16b2 being connected to the ground. Also, the emitters of the transistors 16a2 and 16b2 are connected to each other. The collector of the heating transistor 14b is connected to the first power source V+ via the resistor R42, with the base and emitter of the transistor 14b being connected to the output terminal of an operational amplifier 26b and to the second power source V−, respectively. The node between the resistor R32 and the constant current source 22b is connected to the inverted input terminal of the operational amplifier 26b, with the node between the emitter of the temperature-detecting transistor 18 and the constant current source 24 being connected to the noninverted input terminal of the amplifier 26b. The input signals supplied to the inverted and noninverted input terminals are compared within the amplifier 26b to produce an output signal which is supplied to the base of the heating transistor 14b so as to change the collector current Ic2 flowing through the heating transistor 14b. As a result, the temperature of the semiconductor flow detecting element 10b is kept higher by a prescribed level than the temperature of the fluid under measurement. It should be noted that an output voltage Vo2 corresponding to the difference in temperature between the temperature-measuring transistors 16a2 and 16b2, which is changed by the flow rate of the fluid, is generated between the collectors of the temperature-measuring transistors 16a2 and 16b2. The output voltage Vo2 is supplied to the arithmetic circuit 128. The arithmetic circuit 128 is also supplied with the collector potential Vc2, which is changed by the collector current Ic2, of the heating transistor 14b.

Prescribed arithmetic operations are carried out within the arithmetic circuit 128 using the collector potential Vc1 or Vc2, and output voltage Vo1 and Vo2 so as to calculate the flow rate and flowing direction of the fluid.

The collector potential Vc1 of the heating transistor 14a is:

$$Vc1 = a1 \cdot vf1 \qquad (12)$$

Thus, the flow rate vf1 of the fluid is:

$$vf1 = Vc1/a1.$$

The collector potential Vc2 of the heating transistor 14b is:

$$Vc2 = a2 \cdot vf2 \qquad (13)$$

Thus, the flow rate vf2 of the fluid is: $vf2 = Vc2/a2$. If the mean values of the flow rates vf1 and vf2 are obtained, it is possible to accurately determine the flow rate vf of the fluid.

The following relationship is established among the flow rate vf, flowing direction $\theta$ and output Vo1:

$$Vo1 = b \cdot \sqrt{vf} \cos \theta \qquad (14)$$

Also, the following relationship is established among the flow rate vf, flowing direction $\theta$ and output Vo2:

$$Vo2 = b \cdot \sqrt{vf} \sin \theta \qquad (15)$$

From equations (14) and (15):

$$\tan \theta = Vo2/Vo1 \qquad (16)$$

$$\theta = \tan^{-1} (Vo2/Vo1) \qquad (17)$$

The flowing direction $\theta$ of the fluid is determined as above.

The arithmetic circuit 128 carrying out the arithmetic operations described above is constructed as shown in FIG. 15. Specifically, the collector potential Vc1 of the heating transistor 14a is supplied to a division circuit 60, in which an arithmetic operation is carried out based on formula (12) so as to calculate the flow rate vf1 of the fluid. The flow rate signal vf1 is supplied to an averaging circuit 64. On the other hand, the collector potential Vc2 of the heating transistor 14b is supplied to a division circuit 62, in which an arithmetic operation is carried out based on formula (13) so as to calculate the flow rate vf2 of the fluid. The averaging circuit 64 is also supplied with the flow rate signal vf2 generated from the division circuit 62. An arithmetic average of the flow rate signals vf1 and vf2 is calculated in the averaging circuit 64 so as to determine the flow rate vf of the fluid. The output Vo1 of the temperature-measuring transistors 16a1 and 16b1 is supplied to a division circuit 66 together with the output Vo2 of the temperature-measuring transistors 16a2 and 16b2. The value of Vo2/Vo1 is calculated in the division circuit 66, and the output of the division circuit 66 is supplied to an arithmetic circuit 69. An arithmetic operation is carried out in the circuit 68 based on formula (17) so as to calculate the flowing direction $\theta$ of the fluid. In this embodiment, the flow rate vf and flow direction $\theta$ of the fluid can be measured over a range of 0°–360°.

Figure 16:
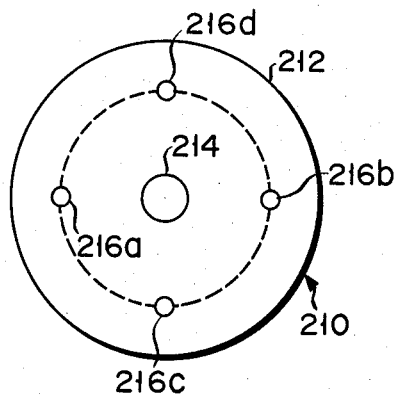
FIG. 16 is a plan view showing a semiconductor flow detecting element included in a semiconductor flow detector according to the ninth embodiment of the present invention.
Figure 17:
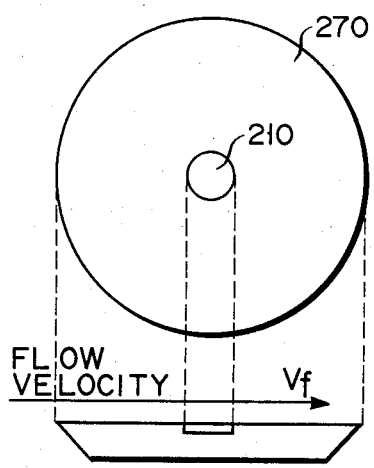
FIG. 17 shows in combination a plan view and a front view of the semiconductor flow detecting element of FIG. 16 housed in a package.

FIGS. 16–20 collectively show a semiconductor flow detector according to the ninth embodiment of the present invention. In this embodiment, a semiconductor flow detecting element 210 comprises a heating transistor 214 formed in the center portion of a semiconductor substrate 212 and temperature-measuring transistors 216a, 216b, and 216c and 216d equidistantly arranged on a circle having the transistor 214 positioned in the center, as shown in FIG. 16. The element 210 of this construction is mounted in a package 270 as shown in FIG. 17 and is incorporated in a circuit shown in FIG. 18 so as to form a semiconductor flow detecting circuit. It should be noted that a fluid temperature-detecting transistor 218 serving to detect the fluid temperature to generate a temperature detection signal is disposed within the fluid under measurement.

Figure 18:
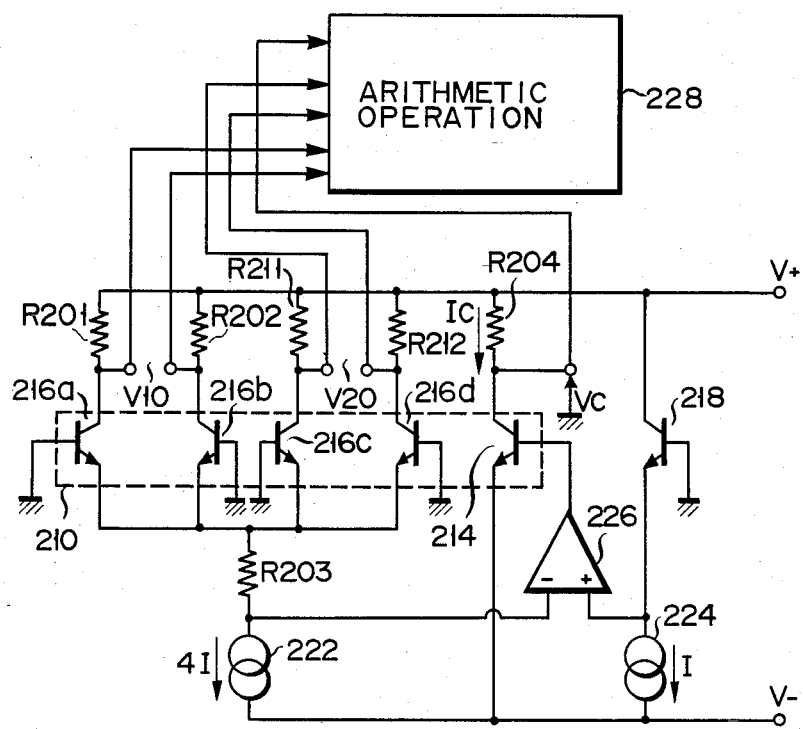
FIG. 18 is a circuit diagram showing the semiconductor flow detector according to the ninth embodiment of the present invention.

As seen from FIG. 18, the collector of the temperature-measuring transistor 216a included in the semiconductor flow detecting element 210 is connected to the first power source V+ via a resistor R201, with the base of the transistor 216a being connected to the ground. The emitter of the transistor 216a is connected to the second power source V− via a resistor 203 and a constant current source 222. The collector of temperature-measuring transistor 216b is connected to the first power source V+ via a resistor 202, with the base and emitter of the transistor 216b being connected to the ground and to the emitter of the transistor 216a, respectively. The collector of the temperature-measuring transistor 216c is connected to the first power source V+ via a resistor R211, with the base and emitter of the transistor 216c being connected to the ground and to the emitter of the transistor 216b, respectively. Further, the collector of the temperature-measuring transistor 216d is connected to the first power source V+ via a resistor R212, with the base and emitter of the transistor 216d being connected to the ground and to the emitter of the transistor 216c, respectively.

The collector of the heating transistor 214 is connected to the first power source V+ via a resistor R204, with the base and emitter of the transistor 214 being connected to the output terminal of an operational amplifier 226 and to the second power source V−, respectively. The collector of the fluid temperature-detecting transistor 218 is directly connected to the first power source V+, with the base of the transistor 218 being connected to the ground. The emitter of the transistor 218 is connected to the second power source V− via a constant current source 224.

The node between the resistor 203 and the constant current source 222 is connected to the inverted input terminal of the operational amplifier 226. The node between the emitter of the transistor 218 and the constant current source 224 is connected to the noninverted input terminal of the operational amplifier 226. The input signals supplied to the inverted and noninverted input terminals of the amplifier 226 are compared within the amplifier 226, and the output signal of the amplifier 226 is supplied to the base of the heating transistor 214 so as to control the collector current Ic flowing through the transistor 214. As a result, the temperature of the semiconductor flow detecting element 210 is kept higher by a prescribed level than the temperature of the fluid under measurement. It should be noted that an output voltage V1o corresponding to the difference in temperature between the temperature-measuring transistors 216a and 216b, which is changed by the flow rate of the fluid, is generated between the collectors of the temperature-measuring transistors 216a and 216b. The output voltage V1o is supplied to an arithmetic circuit 228. Likewise, an output voltage V2o corresponding to the difference in temperature between the temperature-measuring transistors 216c and 216d, which is changed by the flow rate of the fluid, is generated between the collectors of the temperature-measuring transistors 216c and 216d. The output voltage V2o is also supplied to the arithmetic circuit 228. The arithmetic circuit 228 is further supplied with the collector potential Vc of the heating transistor 214 which is changed by the collector current Ic. Prescribed arithmetic operations are carried out in the arithmetic circuit 228 among the collector potential Vc and output voltage V1o and V2o mentioned above so as to calculate the flow rate and flowing direction of the fluid.

It should be noted that the collector potential Vc of the heating transistor 214 is:

$$Vc = a \cdot vf \tag{18}$$

Thus, the flow rate vf of the fluid is: $vf = Vc/a$.

Figure 19:
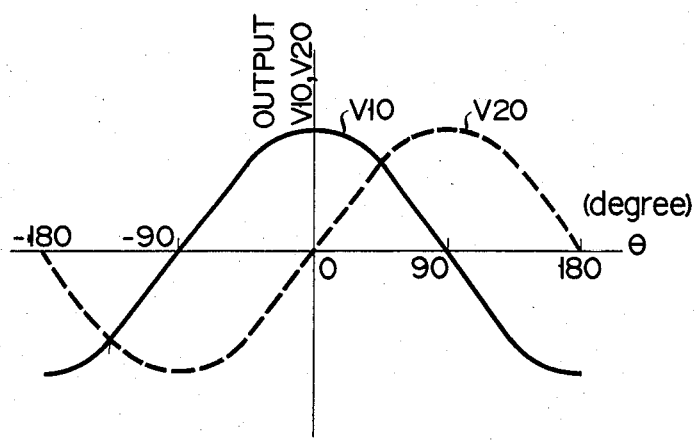
FIG. 19 is a graph showing the relationship between the flowing direction $\theta$ of the fluid to be measured and the outputs $V_{10}$ and $V_{20}$.

FIG. 19 shows the dependence of the output V1o and V2o on the flowing direction $\theta$ of the fluid. The following relationship is established among the flow rate vf, flowing direction $\theta$ and output V1o:

$$ti\ V1o = b \cdot \sqrt{vf} \cdot \cos\theta \tag{19}$$

Likewise, the following relationship is established among the flow rate vf, flowing direction $\theta$ and output V2o:

$$V2o = b \cdot \sqrt{vf} \cdot \sin\theta \tag{20}$$

From equations (19) and (15):

$$\tan\theta = V2o/V1o \tag{21}$$

$$\theta = \tan^{-1}(V2o/V1o) \tag{22}$$

As seen from the above, the flow detector of this embodiment makes it possible to determine the flowing direction $\theta$ of the fluid.

The arithmetic circuit 228 carrying out the operations described above is constructed as shown in FIG. 20. Specifically, the collector potential Vc of the heating transistor 214 is supplied to a division circuit 260, in which an arithmetic operation is carried out based on formula (18) so as to calculate the flow rate vf of the fluid. The output V1o of the temperature-measuring transistors 216a and 216b is supplied to a division circuit 266 together with the output V2o of the temperature-measuring transistors 216c and 216d so as to allow the arithmetic circuit 266 to perform the calculation of V2o/V1o. The output signal of the arithmetic circuit 266 is supplied to an arithmetic circuit 268, in which calculation of formula (22) is carried out so as to determine the flowing direction $\theta$ of the fluid. In this method, both the flow rate vf and flowing direction $\theta$ of the fluid can be accurately measured in this embodiment.

What is claimed is:

1. A semiconductor flow detector for detecting a flow rate and flowing direction of fluid, comprising:
    a first semiconductor flow detecting element including a first heating element formed in the center portion of a semiconductor substrate and a first pair of temperature-measuring elements arranged on side edge portions of the semiconductor substrate to have the first heating element sandwiched therebetween, said temperature measuring elements being positioned symmetrical with respect to the first heating element;
    means for detecting the temperature of the fluid under measurement to generate a temperature detection signal;
    a first driving means for heating the first heating element in accordance with the temperature detection signal to keep the temperature of the first semiconductor flow detecting element higher by a prescribed level than the temperature of the fluid under measurement;
    a first electric power detecting means for detecting the electric power corresponding to the current flowing through the first heating element and contributing to the heating thereof so as to generate a first electric power detection signal Vc;
    a second driving means for driving the first pair of the temperature measuring elements;
    a first temperature difference detecting means for detecting the difference in temperature between the first pair of the temperature measuring elements in terms of an electric signal so as to generate a first temperature difference signal Vo; and
    an arithmetic means for performing a prescribed arithmetic operation based on following equations so as to obtain the flow rate Vf and flowing direction $\theta$ of the fluid, said equations being $Vc = a \cdot Vf$ and $Vo = b \cdot (Vf)^{\frac{1}{2}} \cos\theta$ wherein a and b are essentially constant.

2. The semiconductor flow detector according to claim 1, wherein the first heating element is a bipolar transistor.

3. The semiconductor flow detector according to claim 2, wherein the first electric power detecting means detects the collector potential corresponding to the collector current of the bipolar transistor as the first electric power detection signal.

4. The semiconductor flow detector according to claim 2, wherein the first electric power detecting means detects the base potential of the bipolar transistor as the first electric power detection signal.

5. The semiconductor flow detector according to claim 2, wherein the first electric power detecting means detects the emitter potential of the bipolar transistor as the first electric power signal.

6. The semiconductor flow detector according to claim 1, wherein the first pair of temperature-measuring elements are formed of bipolar transistors.

7. The semiconductor flow detector according to claim 6, wherein the first temperature difference detecting means detects the collector current difference between the pair of bipolar transistors as the first temperature difference signal.

8. The semiconductor flow detector according to claim 1, wherein the first pair of temperature-measuring elements are formed of a pair of diodes.

9. The semiconductor flow detector according to claim 8, wherein the first temperature difference detecting means detects the current flowing through each of the pair of the diodes as the first temperature difference signal.

10. The semiconductor flow detector according to claim 1, wherein:
the first semiconductor flow detecting element further comprises a second pair of temperature-measuring elements disposed in the semiconductor substrate to have the first heating element sandwiched therebetween and arranged in a direction perpendicular to the first pair of the temperature-measuring elements;
the semiconductor flow detector further comprises,
a third driving means for driving the second pair of the temperature-measuring elements,
a second temperature difference detecting means for detecting the temperature difference between the second pair of the temperature-measuring elements as an electric signal so as to generate a second temperature difference signal, and
the second temperature difference signal being supplied to the arithmetic means to enable the arithmetic means to perform prescribed arithmetic operations among the first electric power detection signal, the first temperature difference signal and the second temperature difference signal so as to determine the flow rate and flowing direction of the fluid.

11. The semiconductor flow detector according to claim 10, wherein the arithmetic means includes:
a division means for receiving the first electric power detection signal to have said signal divided by a prescribed value so as to determine the flow rate of the fluid;
means for performing division of the first and second temperature difference signals so as to generate a division signal; and
means for calculating the arc tangent of the division signal so as to determine the flowing direction of the fluid.

12. A semiconductor flow detector for detecting a flow rate and flowing direction of fluid, comprising:
a first semiconductor flow detecting element including a first heating element formed in the center portion of a semiconductor substrate and a first pair of temperature-measuring elements arranged on side edge portions of the semiconductor substrate to have the first heating element sandwiched therebetween, said temperature measuring elements being positioned symmetrical with respect to the first heating element;
means for detecting the temperature of the fluid under measurement to generate a temperature detection signal;
a first driving means for heating the first heating element in accordance with the temperature detection signal to keep the temperature of the first semiconductor flow detecting element higher by a prescribed level than the temperature of the fluid under measurement;
a first electric power detecting means for detecting the electric power corresponding to the current flowing through the first heating element and contributing to the heating thereof so as to generate a first electric power detection signal;
a second driving means for driving the first pair of the temperature measuring elements;
a first temperature difference detecting means for detecting the difference in temperature between the first pair of the temperature measuring elements in terms of an electric signal so as to generate a first temperature difference signal; and
an arithmetic means for performing a prescribed arithmetic operation between the first electric power detection signal and the first temperature difference signal so as to obtain the flow rate and flowing direction of the fluid wherein the arithmetic means comprises:
division means for receiving the first electric power detection signal to have said signal divided by a prescribed value so as to determine the flow rate of the fluid and generate a flow rate signal;
means for receiving the flow rate signal to determine a square root of said flow rate signal so as to generate a square root signal;
means for receiving the first temperature difference signal to have said signal divided by another prescribed value so as to generate a first division signal;
means for receiving the square root signal and the first division signal to have the first division signal divided by the square root signal so as to generate a second division signal; and
means for calculating the arc cosine of the second division signal to determine the flowing direction of the fluid.

13. A semiconductor flow detector for detecting a flow rate and flowing direction of fluid, comprising:
a first semiconductor flow detecting element including a first heating element formed in the center portion of a semiconductor substrate and a first pair of temperature-measuring elements arranged on side edge portions of the semiconductor substrate to have the first heating element sandwiched therebetween, said temperature measuring elements being positioned symmetrical with respect to the first heating element;
means for detecting the temperature of the fluid under measurement to generate a temperature detection signal;
a first driving means for heating the first heating element in accordance with the temperature detection signal to keep the temperature of the first semiconductor flow detecting element higher by a prescribed level than the temperature of the fluid under measurement;
a first electric power detecting means for detecting the electric power corresponding to the current flowing through the first heating element and contributing to the heating thereof so as to generate a first electric power detection signal;
a second driving means for driving the first pair of the temperature measuring elements;
a first temperature difference detecting means for detecting the difference in temperature between the first pair of the temperature measuring elements in terms of an electric signal so as to generate a first temperature difference signal;
an arithmetic means for performing a prescribed arithmetic operation between the first electric power detection signal and the first temperature difference signal so as to obtain the flow rate and flowing direction of the fluid;
a second semiconductor flow detecting element including a second heating element formed in the center portion of a semiconductor substrate and a second pair of temperature-measuring elements mounted in the semiconductor substrate in symmetrical positions with respect to said second heating element, said second pair of the temperature-measuring elements being arranged in a direction perpendicular to the first pair of the temperature-measuring elements;

a third driving means for heating the second heating element in accordance with the temperature detection signal to keep the temperature of the second semiconductor flow detecting element higher by a prescribed level than the temperature of the fluid under measurement;

a second electric power detecting means for detecting the electric power corresponding to the current flowing through the second heating element and contributing the heating thereof so as to generate a second electric power detection signal;

a fourth driving means for driving the second pair of the temperature-measuring elements; and a second temperature difference detecting means for detecting the temperature difference between the second pair of the temperature-measuring elements as an electric signal so as to generate a second temperature difference signal;

wherein the arithmetic means is further supplied with the second electric power detection signal and the second temperature difference signal and performs prescribed arithmetic operations using the first and second electric power detection signals and the first and second temperature difference signals so as to calculate the flow rate and flowing direction of the fluid wherein the arithmetic means includes:

a first division means for receiving the first electric power detection signal to have said signal divided by a prescribed value so as to generate a first flow rate signal;

a second division means for receiving the second electric power detection signal to have said signal divided by a prescribed value so as to generate a second flow rate signal;

an averaging means for receiving the first and second flow rate signals to calculate the arithmetic average thereof so as to determine the flow rate of the fluid;

means for performing division of the first and second temperature difference signals to generate a division signal; and means for calculating the arc tangent of the division signal so as to determine the flowing direction of the fluid.

* * * * *